US009088829B2

(12) United States Patent
Frusciano

(10) Patent No.: US 9,088,829 B2
(45) Date of Patent: *Jul. 21, 2015

(54) METHODS AND APPARATUS FOR IMPROVING SCROLLING THROUGH PROGRAM CHANNEL LISTINGS

(71) Applicant: Time Warner Cable Enterprises LLC, New York, NY (US)

(72) Inventor: Douglas Frusciano, Lafayette, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/077,026

(22) Filed: Nov. 11, 2013

(65) Prior Publication Data

US 2014/0075482 A1    Mar. 13, 2014

Related U.S. Application Data

(63) Continuation of application No. 13/340,914, filed on Dec. 30, 2011, now Pat. No. 8,589,977.

(51) Int. Cl.
*H04N 5/445* (2011.01)
*H04N 21/482* (2011.01)
*H04N 21/84* (2011.01)
*G06F 3/0485* (2013.01)

(52) U.S. Cl.
CPC ............ *H04N 21/482* (2013.01); *G06F 3/0485* (2013.01); *H04N 5/44543* (2013.01); *H04N 21/84* (2013.01); *H04N 2005/44556* (2013.01)

(58) Field of Classification Search
USPC .................................... 725/44–45, 48–49, 52
See application file for complete search history.

(56) References Cited

U.S. PATENT DOCUMENTS

| | | | | |
|---|---|---|---|---|
| 6,721,953 | B1 * | 4/2004 | Bates et al. ...................... 725/39 |
| 2003/0192048 | A1 * | 10/2003 | Sullivan .......................... 725/39 |
| 2006/0248470 | A1 * | 11/2006 | Lee et al. ........................ 715/784 |
| 2010/0269038 | A1 * | 10/2010 | Tsuda ............................. 715/702 |
| 2010/0306806 | A1 * | 12/2010 | Kim et al. ........................ 725/61 |

* cited by examiner

Primary Examiner — Nathan Flynn
Assistant Examiner — Sumaiya A Chowdhury
(74) Attorney, Agent, or Firm — Straub & Pokotylo; Michael P. Straub; Stephen T. Straub

(57) ABSTRACT

Methods and apparatus for improving channel browsing experience for users by control scroll rates in guide listings are described. A user can scroll through channel listings arranged according to program genre at a high maximum scroll rate. The scroll rate is automatically reduced, and in some embodiments scrolling is temporarily paused, when listings corresponding to a new genre are displayed. In this way a high maximum scroll rate can be supported but without the risk of a user unintentionally scrolling thorough an entire genre of programs of interest even if the genre only includes one or a few programs in total. Thus, in various embodiments a scrolling rate is decreased when a change in the genre of programs from a first genre of programs being displayed to a second genre of programs being displayed occurs as part of said scrolling.

20 Claims, 6 Drawing Sheets

METHODS AND APPARATUS FOR IMPROVING SCROLLING THROUGH PROGRAM CHANNEL LISTINGS

RELATED APPLICATIONS

The present application is a continuation of U.S. patent application Ser. No. 13/340,914 filed Dec. 30, 2011 entitled "METHODS AND APPARATUS FOR IMPROVING SCROLLING THROUGH PROGRAM CHANNEL LISTINGS" which is hereby expressly incorporated by reference in its entirety.

FIELD OF THE INVENTION

The invention relates to methods and apparatus for improving display of channel guide listings for users and, more particularly, to methods and apparatus for controlling the scroll rate of listings such as program and/or channel guide listings, e.g., based on information about the genre of the content to which the listings relate.

BACKGROUND OF THE INVENTION

In conventional grid guide applications, e.g., TV channel and/or program guide applications, set top boxes and/or other listing control devices often allow users to rapidly scroll through a large set of program and/or channel listings by pressing and holding an arrow key on the remote control. In known systems, once the maximum scroll rate is reached, as long as the arrow key remains depressed, scrolling through the channel listings will continue at the maximum scroll rate until the listing guide being displayed runs out of new information to be displayed and/or a user provides a change in feedback, e.g., by releasing the arrow key and/or pressing another control key on the control device, e.g., remote control.

While scrolling at the maximum scroll rate, it can be difficult for a user to read program and/or channel titles or other descriptive information. The user can easily scroll past a program, channel, and/or group of channels which may be of interest to the user. To allow a user to consider the listings, scroll rates used in current channel guides maybe somewhat limited in term of the maximum permitted scroll rate.

It should be appreciated that while a user may want to scroll through one or a group of channels corresponding to content the user is not interested in quickly. However, it would be desirable if there could be a way of drawing attention to the start of a group of programs or channels so that a user could make an informed decision about whether or not the channels should be scrolled through at the maximum rate or at some other rate which would allow for more meaningful review of the program listing information than when scrolling at the maximum rate.

In view of the above, there is a need for improved methods and/or apparatus for controlling scroll rates and/or the presentation of guide listing information to users of devices such as televisions, set top boxes, etc.

SUMMARY OF THE INVENTION

Methods and apparatus for providing guide listing information, e.g., channel listings providing program information are described. In accordance with various features of the invention, the scroll rate is controlled as a function of the listing information. In particular, channel groups are taken into consideration in controlling the scroll rate. While a user may control a remote control to send scroll control signals, e.g., indicating a desire to scroll at the maximum scroll rate, the scrolling of the guide listing information may, and in some embodiments is, automatically decreased when the start of a new group of channels and/or programs is displayed as part of the listing being scrolled through.

The slowing of the scroll rate at the start of a program or channel grouping, in embodiments where channels and/or programs are presented in groups, e.g., according to genre, brings attention to the start of the program or channel grouping and allows the user to fully consider the start of the new genre and take action to alter the indicated scroll rate if desired.

In various embodiments, to allow a user to take advantage of the automatic scroll rate control feature described herein, channels and their corresponding programs are arranged according to program genre. Thus, channels in the program/channel guide listing are arranged into genre in at least some embodiments. The genre listing may be based on content information included in the guide information and/or channel listing. For example, history programs, westerns, news programs, horror movies, science fiction, channels and/or programs may be grouped together, e.g., with the genre groupings in some cases not being dependent on channel numbering. Within a channel grouping corresponding to a genre, the channels may be presented in channel number order.

A guide may be received from a headend or other source of guide information pre-arranged accordingly to genre. However, in some embodiments a set top box or other guide listing display control device receives guide content information and processes it to generate channel groups based on genre. The sorting of channels into genre can be based on a genre field and/or other descriptive information provided as part of a channel/program guide. In some embodiments a genre listing is requested from a headend or other source of program information, e.g., in response to a user scrolling or selecting a genre ordering from a plurality of different channel listing presentation options which list alternative ordering presentations or which allow a user to customize groups used to control the presentation of channel listings.

In accordance with the present invention, a set top box and/or other channel listing presentation control device stores information indicating where different channel and/or program groupings occur within a set of channels/programs which are to be presented in a guide listing where programs and/or channels are grouped, e.g., according to genre or some other grouping. As a user scrolls through the listings and a new genre and/or other grouping of channels changes, e.g., a new genre of programs begins being displayed, the scroll rate is changed, e.g., reduced. The reduction in scroll rate may even include a brief pause in scrolling to allow a user to briefly consider the new genre channel listings which are displayed. The reduction in scroll rate is temporary unless a user takes action to stop the scrolling and/or reduce the indicated scrolling rate, e.g., by releasing the scroll arrow key on the remote control device.

By slowing and optionally briefly pausing scrolling on reaching a new genre of channels and/or programs, the use is given the opportunity to appreciate that information corresponding to a new program genre is being displayed and to take action if desired to allow for the programs in the new genre to be more fully reviewed, e.g., by releasing the scroll key.

Since the approach of the present invention provides a user an opportunity to detect and reduce the rate of scrolling at the start of a genre as it begins being displayed, a higher maximum scroll rate may be supported than in cases where the maximum scroll rate is kept to a speed which allows a user to carefully review program listings as they are being displayed.

Thus, the approach allows scrolling through genres at a faster rate than some conventional designs but without the risk of a user accidently scrolling through the listings of a genre of interest without being given adequate time to notice the genre and corresponding program listing(s). This is because scroll speed will automatically slow down when a new genre of channels is reached. This automatic, temporary reduction in scroll speed gives the user time to recognize the new genre and either stop rapid scrolling to look at the programs for that genre, or allow the scroll to speed up again and bring the user to the next genre at a relatively rapid rate.

The ability for a user to rapidly scroll through a region's television channel line-up grouped according to genre while making the user aware that he/she has reached a new genre of channels during the rapid scroll by changing the scroll rate reduces the risk of a user missing a program listing of interest. As a result of the automatic slowing of scrolling at the start of a genre listing, the scrolling speed will vary depending on where the user is inside of a channel list. During the scroll, the speed will increase from the beginning of a particular genre of channels until it has reached a maximum speed and/or a different genre channel listing set. At the start of the different genre channel listing the speed of scrolling will, in some embodiments, significantly slow down so that the user can easily identify which genre they have scrolled into. The scrolling then starts to pick up speed again until it hits the maximum scroll rate and/or the next genre of channels.

The methods and apparatus described herein are particularly well suited for a grid guide application, e.g., for a subscription video subscriber such as a cable TV and/or satellite TV subscriber where channels and/or programs are presented in a grouped manner, e.g., according to genre. With ever increasing channel line-ups, the methods described herein are particularly useful in allowing users to move around a channel lineup in a more efficient way than where the scroll rate is limited to a rate which allows a user to carefully review all channel listing as they are displayed.

In some embodiments the maximum scroll rate which is used at a given point in time is determined based on the type of guide presentation format selected by a user. For example, a user may select between a genre based guide presentation format and a non-genre based, e.g., channel number based, presentation format. In the case of genre grouped program channels, multiple channels corresponding to a genre, e.g., history, are grouped together so that history channels are not interrupted in the listing by a channel corresponding to another program genre, e.g., news. In the channel number order listing program channels are displayed consecutively in number order, as a result channels corresponding to different genres may be intermixed in the program listing, e.g., a news program channel may be displayed in between two program channels corresponding to a different genre such as history.

In at least some embodiments, a first maximum scroll rate is used for program guide scrolling when displaying listings which are not grouped according to genre and a second maximum scroll rate is used when displaying genre grouped channel and/or program listings where the second maximum scroll rate is faster than the first maximum scroll rate. In the case of genre grouped program listings, the scrolling is temporarily slowed or paused if the maximum scroll rate is being used at the start of a new genre being displayed thereby allowing a viewer to recognize and appreciate the start of the display of channels and program listing corresponding to the new genre. However, in the case of a non-grouped channel or program listing, the first lower maximum scroll rate is used and is not slowed in the event of encountering a channel corresponding to a different program genre.

Thus, in at least some embodiments, a guide grouping of channels according to the genre of programs being displayed in the channels is used during some times. At other times, a user may select a channel numbered presentation order or some other arrangement where the program channels are not grouped according to genre. In some but not all embodiments the maximum scroll rate to be used for program guide scrolling is determined based on the user selected guide display format at a particular point in time with the maximum scroll rate being different depending on the user selected presentation format.

In at least one embodiment, an exemplary method of providing program guide information, comprises: displaying at least a portion of a program guide including a listing of programs arranged according to genre; receiving a scroll control signal; and in response to said scroll control signal, scrolling through said listing of programs, scrolling through said listing of programs including decreasing a scrolling rate when a change in the genre of programs from a first genre of programs being displayed to a second genre of programs being displayed occurs as part of said scrolling.

An exemplary apparatus for providing program guide information, comprises: a program guide presentation module configured to display, on a display device, at least a portion of a program guide including a listing of programs arranged according to genre; an interface including a receiver configured to receive a scroll control signal; and a control module configured to decrease a scrolling rate, while scrolling through said listing of programs in response to the scroll control signal, when a change in the genre of programs from a first genre of programs being displayed to a second genre of programs being displayed occurs as part of said scrolling.

Various additional features and advantages of the present invention are discussed in the detailed description which follows.

DETAILED DESCRIPTION

Figure 1:
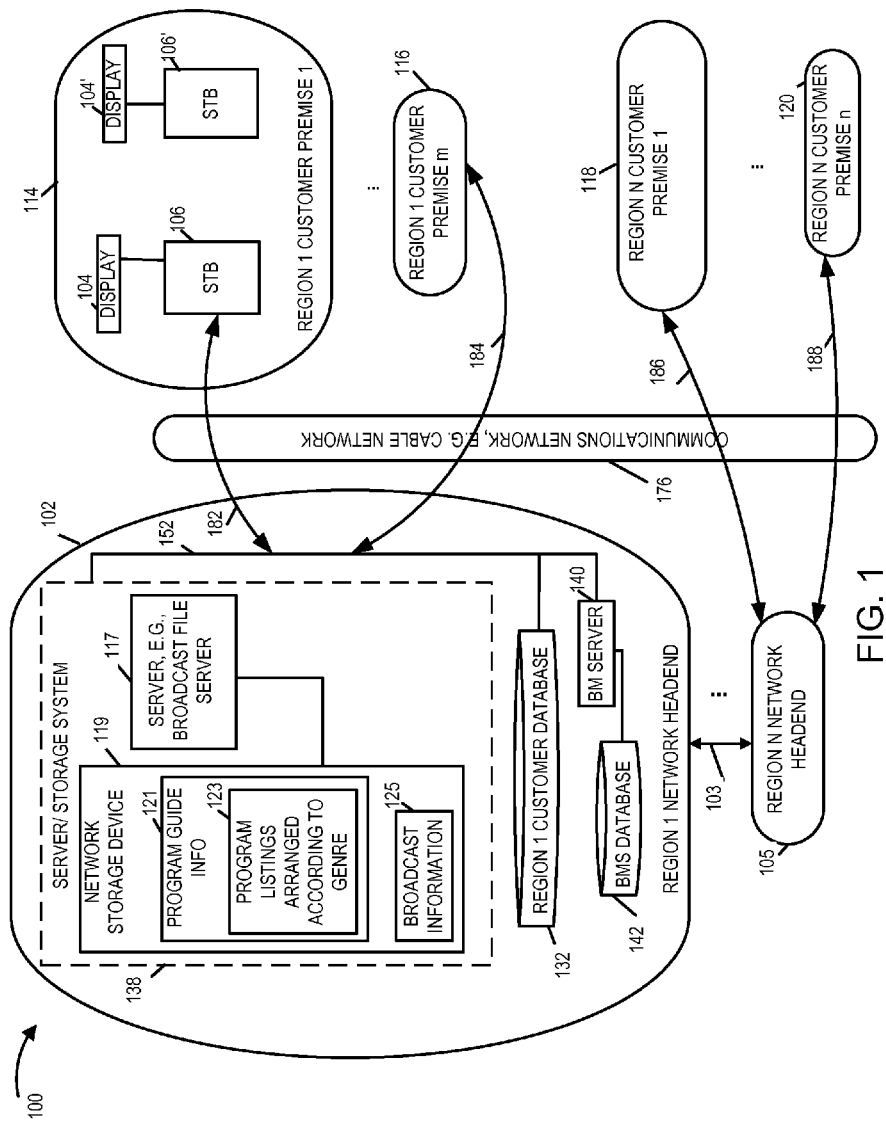
FIG. 1 illustrates an exemplary communications network implemented in accordance with the present invention.

FIG. 1 illustrates an exemplary content delivery and distribution system 100 implemented in accordance with the invention. The system 100 supports the provisioning of content delivery services, as well as user content selection, communication of content and/or other program information to a user device, notification of content availability, and billing for content provided to customers in accordance with various embodiments of the present invention. Exemplary system 100 includes a plurality of N regional service provider systems in the form of regional headend systems 102, 105. The N regional service provider systems include the first network head end system 102 corresponding to a first region, i.e., Region 1, and a region N service provider system in the form of headend system 105 corresponding to region N.

Each regional service provider system, e.g., region 1 service provider system 102, region N service provider system 105, provides services, e.g., content delivery services, via communications network 176, to a corresponding set of customer premises 114, 116, 118, 120 which correspond to the region serviced by the particular headed system. For example, region 1 network headend 102 provides services to the M customer premises 114, 116 corresponding to Region 1 while Region N network headend provides services to region N customer premise locations 1 through N 118, 120. As should be appreciated the number of customer premises M and N, respectively, will vary depending on the particular region and the number of customer locations in the individual region.

Each customer premise in a region may include one or more set top boxes in combination with a display device and/or one or more other types of content playback devices. For example, Region 1 customer premise 1 114 includes a first set of equipment, e.g. user 1 set top box (STB) 106 in combination with display 104. STB 106 is shown coupled to display 104, which may and in some embodiments is, a television set. However, it should be appreciated that the STB 106 can be integrated in a device which also includes the display 104. The STB 106 may, and often does, include Digital Video Recorder (DVR) functionality, program guide modification and presentation capabilities.

Region 1 network head end 102 includes a Server/storage system 138, a region 1 customer database 132, and a business management (BM) server 140 which in turn is coupled to a BMS (business management system) database 142. The customer database 132 is used to store customer account information, e.g., customer name, address, STB identification information, STB capability information, and information about customer subscribed services. The business management server database 142 coupled to business management (BM) server 140 includes customer billing information. As should be appreciated the BMS database 142 may be, and in some embodiments is, integrated with the customer database 132.

The server/storage system 138 includes the content server 117, e.g., a broadcast file server (BFS) 117 and/or an on-demand content server, coupled to a network storage device 119. Network storage device 119 stored content, e.g., audio and video content which may be delivered either as part of a content broadcast by server 117 or in response to an on-demand request for content received via network 176 from one or more customer premises 114, 116.

The various servers 138, 140 present in the network headend 102 are coupled together via a bus 152 over which they may interchange data and information and which can be used to supply content to the communications network 176 for delivery to various customer premise devices 106, 106'.

As shown in FIG. 1, region 1 customer premise 1 114 is coupled to region 1 network head end 102 via communications network 176 which can, and in some embodiments is, implemented as a cable network. Communications link 182 traversing the service provider's cable network 176 couples set top box 106 to the region 1 network head end's bus 152. Similarly, region 1 customer premise m 116 is coupled to region 1 network headend bus 152 via link 184 which traverses service provider cable network 176.

Region N customer premise 1 118 is coupled to region N network head end 105 via a communications link 186. Similarly, region N customer premise n 120 is coupled to region N network head end 105 via a communications link 188. The network headends 102, 105 of the different regions are coupled together, e.g., via link 103 which may be over a back haul fiber optic network used to connect headend offices 102, 105.

Network storage device 119 includes programs such as movies, content of regional favorites, content of seasonal favorites, etc., which can the broadcast to the customer premise devices 106, 106'. The delivery of video and/or other content may, and normally is through server 117, that may output the content as a QAM (Quadrature Amplitude Modulated) signal that can be delivered over the cable network 176 to one or more set top boxes. In some embodiments the server 117 provides video streams, e.g., broadcast streams, to the set top boxes 106, 106' and/or any other customer premise device.

Network storage device 119 may also include program guide information 121 and broadcast information 125. The program guide information 121 provides channel guide information. This information is broadcast to the STB devices and can be used by a set top box for generating a program guide displayed to a user. The program guide information 121 is shown as being stored in network storage device 119 but may, and in some embodiments is, stored in memory within the server 117 and periodically broadcast to the STBs 106, 106' via communications network 176. In accordance with one aspect, in some embodiments the program guide information also includes a listing of programs arranged according to genre 123. The listing of programs arranged according to genre 123 may be, and in some embodiment is, broadcast to one or more set top boxes periodically. However in some embodiments the information 123 is not broadcasted periodically to all the STBs in the region 1 but rather upon a request from one or more set top boxes. As will be discussed, in accordance with one feature of some embodiments, the listing of programs information 123 is used by a set top box to generate a genre arranged program guide including listing of programs arranged according to genre, to present to the user/customer.

Business management server 140 generates and processes billing information corresponding to region 1 customers, e.g., updating billing charge information in response to upgrades, video on demand purchases, and/or other activity. Business management server 140 also processes bill payment information, e.g., credit card transactions, deductions from debit accounts, mail bills, and/or processes discount and/or coupon information.

Figure 2:
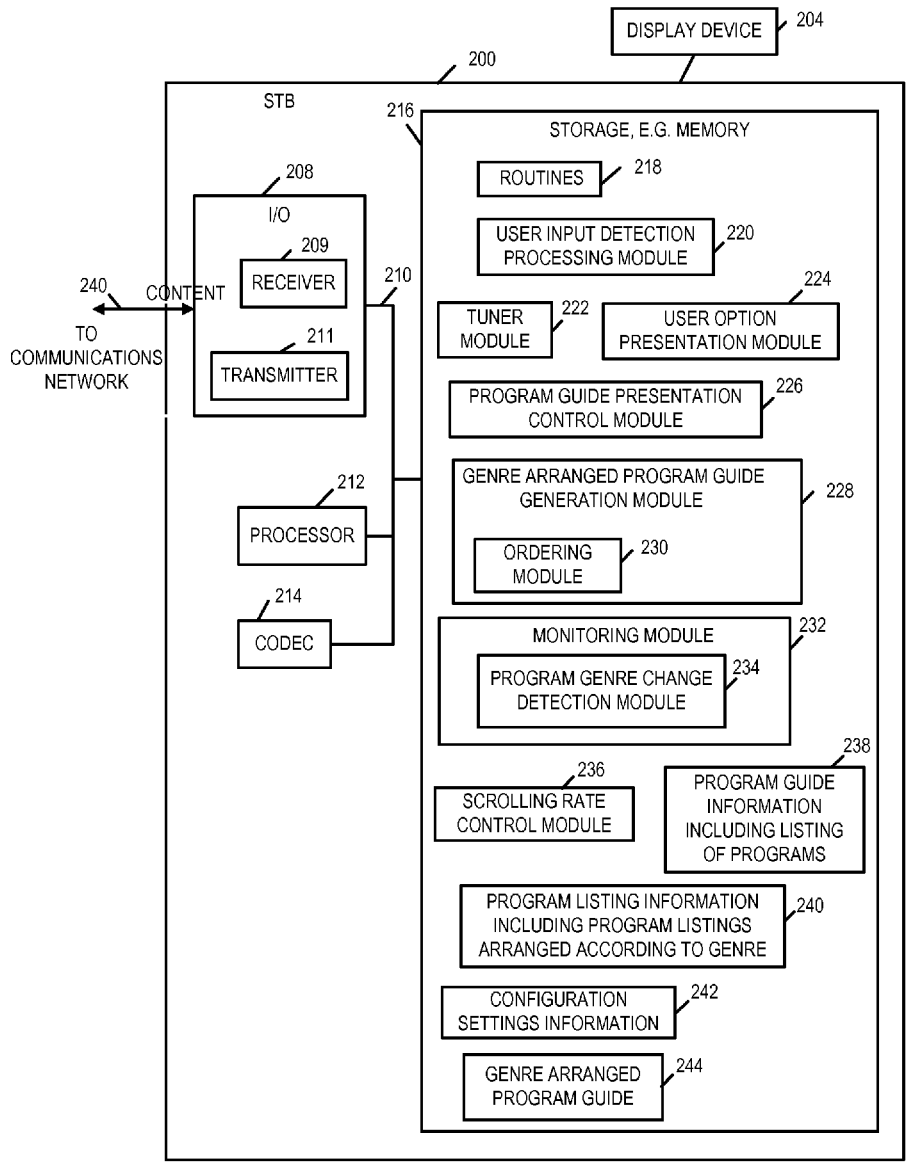
FIG. 2 illustrates an exemplary set top box which may be used in the exemplary communications network of FIG. 1.

FIG. 2 illustrates an exemplary set top box (STB) 200 implemented in accordance with one exemplary embodiment. The exemplary STB 200 may be used as any one of the STBs 106, 106' of the system shown in FIG. 1. As shown, the STB 200 is coupled to a display device 204, e.g. a monitor and/or a Television (TV). The STB 200 includes an Input/Output (I/O) interface 208, a processor 212, a codec (Coder/Decoder) module 214, and a storage device, e.g., a memory 216, coupled together via a bus 210. The various elements of the STB 200 can exchange data and information over the bus 210. Via the I/O interface 208, the STB 200 can exchange signals and/or information with other devices and/or system elements such as the server/storage system 138 in the network head end 102 of region 1, via the communications network 176. The I/O interface 208 supports the receipt and/or transmission of content and/or other information from/to different servers, e.g., the BFS server 117, as represented by arrow 240. The I/O interface 208 in some embodiments may also include, e.g., an infrared signal receiver to receive signals from a user remote control device.

The processor 212, e.g., a CPU, executes routines 218 stored in the memory 216 and, under direction of the routines 218, controls the STB 200 to operate in accordance with the invention. The processor 212 is responsible for controlling the general operation of the set top box 200 including, e.g., presentation of genre arranged program guide and/or programs for display. To control the STB 200, the processor 212 uses information and/or routines including instructions stored in memory 216. Routines 218 include communications routines and set top box control routines.

The Codec 214 is implemented as a module and is capable of performing encoding and/or decoding operations on a digital data stream or signal.

The memory 216 includes routines 218, a user selection detection and processing module 220, a tuner module 222, a user option presentation module 224, a program guide presentation control module 226, a genre arranged program guide generation module 228, a monitoring module 232 including a program genre change detection module 234, a scrolling rate control module 236, program guide information 238, program listing information including program listings arranged according to genre 240, user configuration settings 242 and genre arranged program guide 244.

User input detection and processing module 220 detects a user input, e.g., from a control device such as a remote control. Signals from the remote control may be received via I/O module 208 which may include, in addition to a cable network interface, an IR (infrared) or radio interface for receiving signals from a remote control device. The input detection module 220 determines, on receipt of a signal, e.g., control signal providing user input, as to what type of control signal is received and/or what type of selection has been made by the user, e.g., a program guide selection, a channel selection, a scroll control signal, an on-demand service selection, etc.

The tuner module 222 is configured to tune to a frequency corresponding to a program channel to be viewed. The tuner module 222 may consult the program channel information received from the headend 102 to determine the frequency corresponding to the user selected channel so that the tuner can tune to the correct frequency.

The user option presentation module 224 supports the interaction between the STB 200 and the user operating STB 200. The user option presentation module 224, in some embodiments, controls presentation of a prompt to the user of the STB 200 on the display device 204, providing the user an opportunity to select a genre arranged program guide in place of the normal program guide. In some embodiments the user option presentation module 224 is configured to present a prompt to the user of the STB 200, following detecting that the user has requested to view the program guide, providing the user an opportunity to set genre arranged program guide presentation as a default so that whenever user selects program guide presentation, e.g., from the remote control, the genre arranged program guide is presented.

The program guide presentation control module 226 is for controlling presentation of a program guide, e.g., regular program guide and/or genre arranged program guide, upon user request. In various embodiments the program guide presentation control module 226 controls presentation, e.g., displaying, of at least a portion of a program guide including listing of programs arranged according to genre, e.g., in response to the user's request.

User configuration settings are stored in the memory as configuration settings information 242 and may be updated upon detecting a change in the settings by the user. The configuration settings information 242 include, among other things, settings indicating whether the user likes to view regular program guide or genre arranged program guide. For example, in some embodiments is, when genre arranged program guide option is enabled by the user, then each time when the user selects to view the program guide, a genre arranged program guide is presented by default in place of the regular guide. When the auto genre arranged program guide option is not enabled, the program guide presentation module 226 provides an option to the user to select regular program guide or the genre enabled program guide.

Genre arranged program guide generation module 228 is responsible for generating the genre arranged program guide. The genre arranged program guide generation module 228 uses program guide information 228 and/or program listing information 240 received from the headend 102 to generate the genre arranged program guide. In some embodiments information the genre arranged program guide is not generated by the STB 200 and is received from the headend 102. In various other embodiments the genre arranged program guide generation module 228 can generate the genre arranged program guide using the program listing information 238 and/or 240. In some embodiments the STB 200 only receives program guide information including listing of programs 238 from the headend 102. In some embodiments the program guide information including listing of programs 238 includes a program listing of channels arranged according to channel number and genre information for individual listings in the listing of programs. In some such embodiments, the ordering module 230 uses the information 238 and orders the program listings according to genre. In some embodiments the ordering performed by ordering module 230 is based on genre information included for individual channels in the program listing of channels arranged according to channel number.

The monitoring module 232 monitors entries in the listing of programs in the genre arranged program guide being displayed to the user. The monitoring module 232 includes a program genre change detection module 234 configured to detect a change in the genre of program listings being displayed. Thus the monitoring module 232 monitors entries in the listing of programs in the genre arranged program guide to detect when the end of a genre is displayed or the beginning of a genre is displayed indicating a change in the genre of program listings being displayed.

Scrolling rate control module 236 control the scrolling rate used to scroll through the listing of programs in the genre arranged program guide. The scrolling rate control module 236 is responsive to a scroll control signal received from the user and in response to the scroll control signal, controls scrolling through the listing of programs in the genre arranged program guide. The scrolling rate control module 236 is configured to decrease the scrolling rate when a change in the genre of programs from a first genre of programs being displayed to a second genre of programs being displayed occurs as part of the scrolling. In various embodiments the decreasing of the scrolling rate is triggered by said monitoring detecting the display of a program listing corresponding to the end of a program genre or the display of a program listing corresponding to the beginning of a program genre.

The scrolling rate control module 236 receives information as an input from the monitoring module 232 including the genre change detection module 234 and uses the received information in controlling the scrolling rate in accordance with the invention. In various embodiments the scrolling rate control module 236 is further configured to increase the scrolling rate from the decreased rate as the second genre of programs continues to be displayed. For example, when the second genre, e.g., COMEDY, starts after end of the first genre, e.g., HORROR, the scrolling rate control module 236 increases the scrolling rate from the decreased rate as the user continues to scroll through the listing of programs in the COMEDY genre. In various embodiments the control module 236 continues to increase the scrolling rate while the scroll signal is received until a maximum scroll rate is achieved. In some embodiments the control module 236 decreases the scrolling rate to an initial scroll rate used to scroll through programs at the start of a program listing corresponding to a program genre. In various embodiments the initial scroll rate is a predetermined scroll rate used to scroll through at the start of the listings corresponding to each new program genre which is displayed during said scrolling.

Program guide information including listing of programs 240 is received from the headed 102 and may be used by the program guide generation module 228 to generate a genre arranged program guide 244 and/or a regular program guide. In some such embodiments the generation module 228 uses the ordering module 230 to arrange the program listings according to genre and generate the genre arranged program guide 244.

In some embodiments the program guide generation module 228 requests from a server, e.g., such as server 117 in the headend 102, program listing information including program listings arranged according to genre 240, in order to generate and provide the genre arranged program guide. The request is transmitted by the transmitter 211. Thus in some embodiments the STB 200 receives, in response to said request, a listing of programs which is already ordered and arranged according to genre, e.g., information 240, and uses it to generate the genre arranged program guide 244.

In some embodiments the program listing information including program listings arranged according to genre 240 includes information identifying at least one of: i) a location in said listing of programs where a first genre ends or ii) a location in said listing of programs where a second program genre begins. In some embodiments the information identifying at least one of: i) a location in said program listing where a first genre ends or ii) a location in said listing of programs where a second program genre begins includes at least one of: i) a channel number corresponding to the last program in said first genre and a corresponding genre identifier; and ii) a channel number corresponding to the first program in said second genre and a corresponding genre identifier.

Figure 3A:
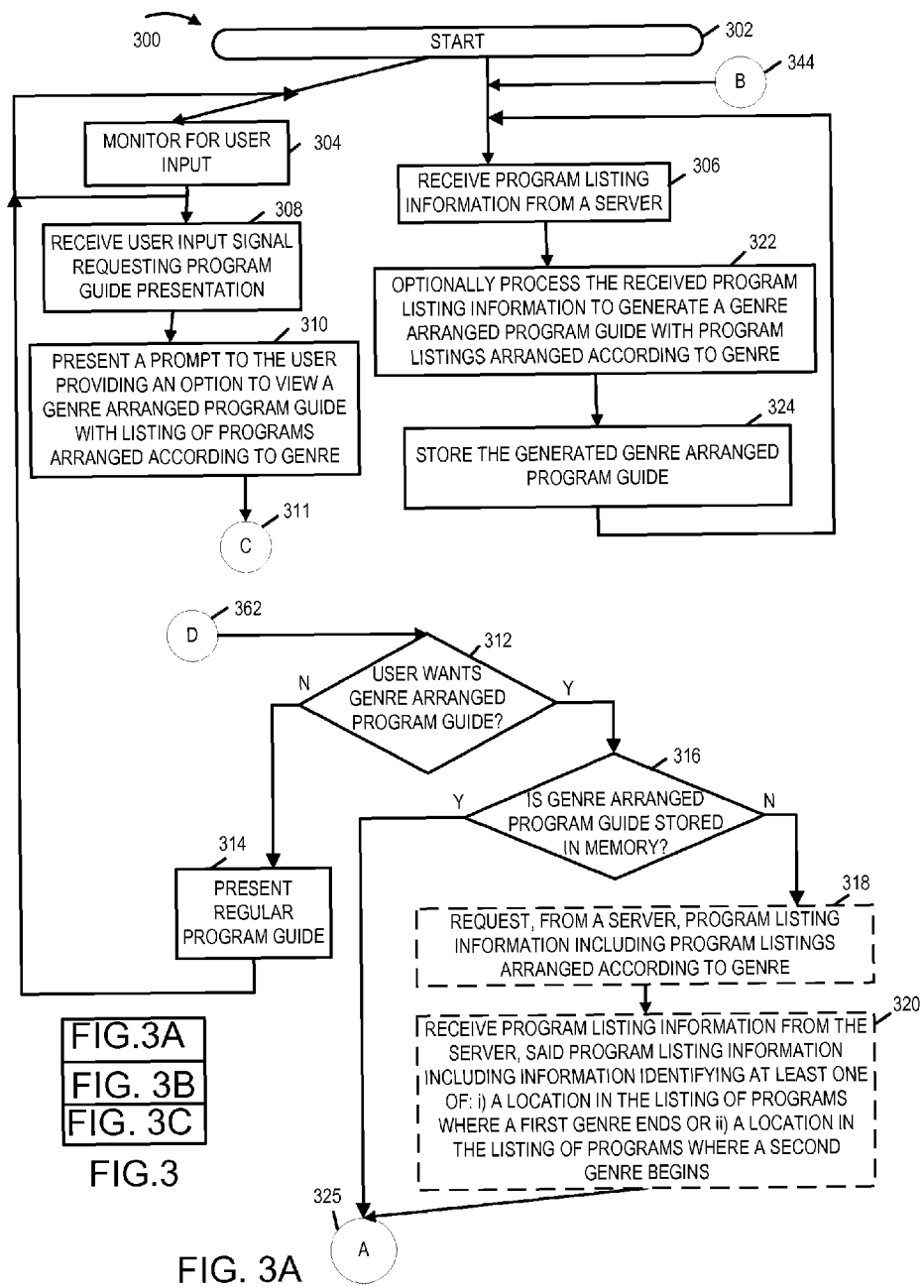
FIG. 3, which comprises the combination of FIGS. 3A, 3B and 3C, is a flowchart illustrating the steps of an exemplary method which can be performed by an exemplary set top box, in accordance with the invention.
Figure 3B:
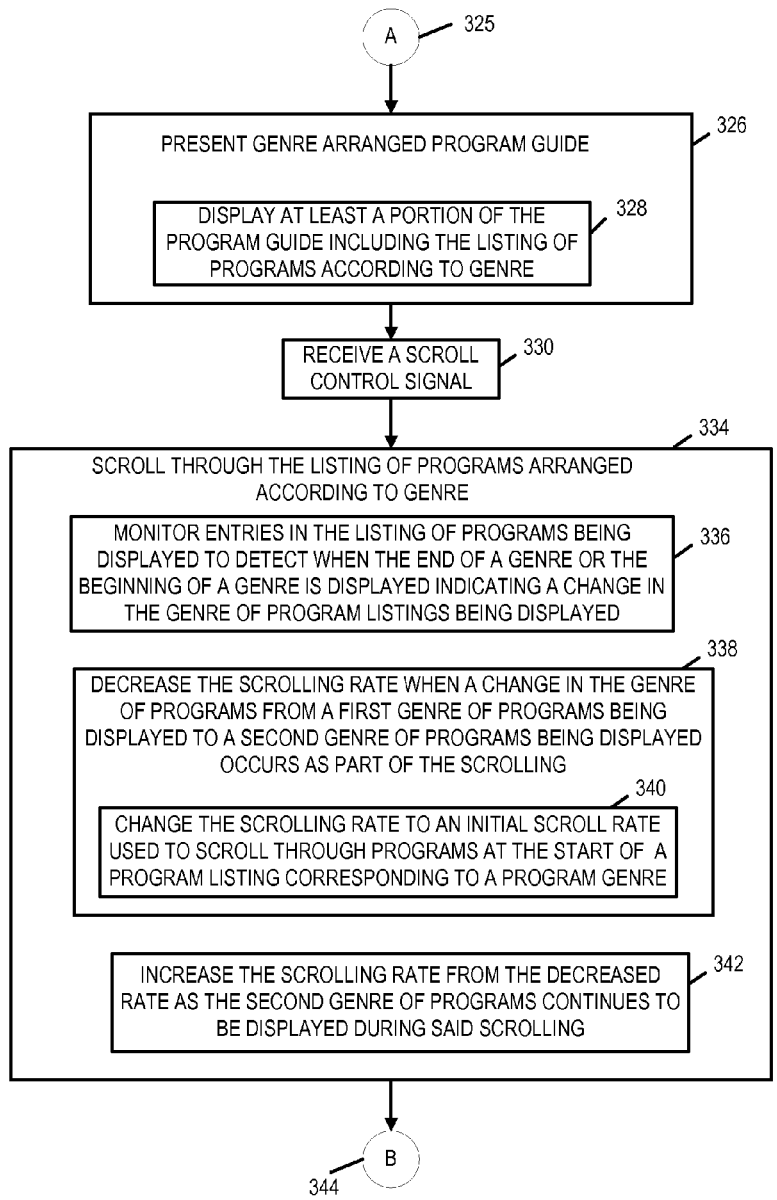
Figure 3C:
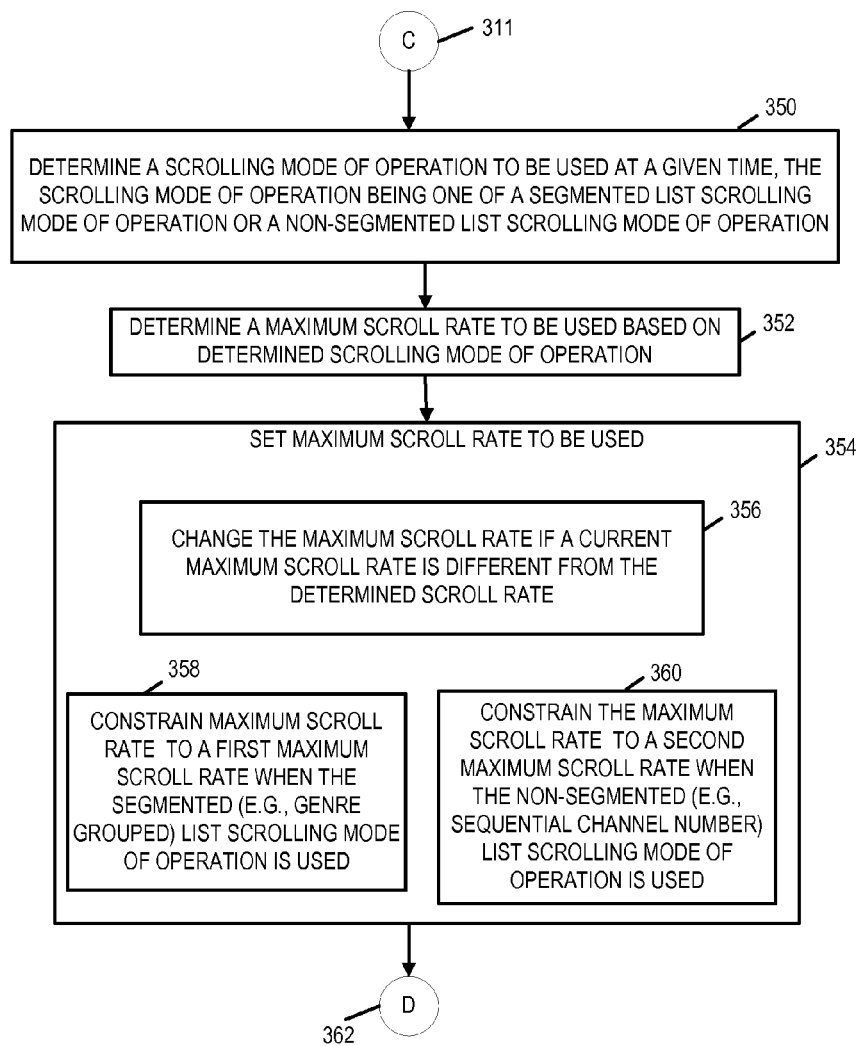

One particular exemplary embodiment will now be described with reference to FIG. 3. FIG. 3 which comprises the combination of FIGS. 3A, 3B and 3C is a flowchart 300 illustrating the steps of an exemplary method of providing program guide information, in accordance with the invention. The method of flowchart 300 can be, and in some embodiments is, performed by a set top box such as the STB 200 of FIG. 2. The exemplary method starts in step 302 where the STB 200 is powered on and initialized. Operation proceeds from step 302 to steps 304 and 306 which may be performed asynchronously in parallel. Thus, steps 304, and 306 represent different operational paths which may be implemented in parallel. The path 304 relates to processing and responding to user input while the path corresponding to step 306 corresponds to the receipt and processing of program listing information, e.g., from a sever located at a network headend or another device which provides program guide listing information either on a regular basis and/or on request.

In step 306 the STB 200 receives program listing information from a server, e.g., from the server 117 in headend 102. In various embodiments the program listing is periodically broadcast by the server 117 to various STBs served by the headend 102. In some embodiments the program listing information includes genre information for individual program listings, e.g., various individual program channel entries, in a listing of programs. In some embodiments the genre information is specified for individual channels in a listing of channels arranged according to channel number. In some embodiments, as part of processing the received program listing information to generate a genre arranged program guide, the STB arranges program listings according to genre to generate the genre arranged program guide, said arranging being based on the genre information.

Operation proceeds from step 306 to step 322. In step 322 the STB 200 optionally processes the received program listing information to generate a genre arranged program guide with program listings arranged according to genre.

In some embodiments a genre arranged program guide is broadcast from the headend to various customer premise devices, e.g., STBs served by the headend 102. Thus in some embodiments the STB 200 does not need to perform processing to generate a genre arranged program guide but may receive the guide already arranged in, and including, genre grouping information. Operation proceeds from step 322 to step 324 where the STB stores the generated program guide. Steps 306, 322 and 324 may be repeated and performed on a periodic basis. Thus, by the end of step 324 the STB has received and/or generated information which enables it to present a program guide according to channel number order or according to genre grouping, e.g., with program channels being grouped according to the genre of programs being supplied on the channels.

The user input related processing path starting with step 304 will now be described. In step 304 the STB 200 monitors for a user input, e.g., such as a signal from a user remote control device. The STB 200 may receive one or more input signals from the user at different times, e.g., signal for program guide presentation, scroll control such as a signal indicating a depressed forward arrow, channel selection control signal, etc. The STB 200 accordingly responds to different signals in different ways, in accordance with the invention as a function of the user selected mode of program guide display. Operation proceeds from step 304 to step 308.

In step 308 the STB detects user input and receives a user input signal requesting program guide presentation. Operation proceeds from step 308 to step 310 where a prompt is presented to the user, requesting the program guide, thereby providing the user an option to view a genre arranged program guide with program listings arranged according to genre or to use a default, e.g., program channel number arranged guide. The prompt is displayed on the user display device and in some embodiments the user may respond by selecting a "YES" or "NO".

Operation proceeds from step 310 to step 350 via connecting node 311. In step 350, the STB determines a scrolling mode of operation to be used based on the user input where the scrolling mode of operation is one of a segmented list scrolling mode of operation, e.g., a genre arranged program guide mode of operation, and a non-segmented list scrolling mode of operation, e.g., a channel number ordered mode of operation. If the user indicated a yes in response to the prompt presented in 310, the segmented list, e.g., genre arranged program guide mode of operation is determined to have been selected and is to be used. Otherwise the default non-segmented list, e.g., channel number ordered, scrolling mode of operation is to be used.

From step 350 operation proceeds to step 352 in which a maximum scroll rate to be used is determined based on the determined scrolling mode of operation. If a segmented listing is to be presented, e.g., a genre based program listing with different program listing segments corresponding to different genres, a first maximum scroll rate is determined but if the program listing is non-segmented, e.g., the programs are not arranged into different groups such as based on genre, a second maximum scroll rate is determined to be the maximum scroll rate which should be used. The first maximum scroll rate in some embodiments is faster than the second maximum scroll rate. Thus, program listings may be scrolled through more quickly within a program genre once the maximum scroll rate is achieved than in a program listing which is not arranged by genre.

With the maximum scroll rate having been selected in step 352 to correspond to the particular user selected program guide listing presentation format, operation proceeds to step 354 where the maximum scroll rate to be used is set in step 354 to the rate which was determined in step 352. Step 354 may include one or more various sub-steps including step 356 and, depending on the maximum scroll rate which is being set, either step 358 or step 360. Substep 356 is performed if the maximum scroll rate currently in use is different from the maximum scroll rate determined in step 352 which is to be used for the user selected program guide presentation format. In step 356, the maximum scroll rate is changed to the scroll rate determined in step 352 which is to be used if the current maximum scroll rate is different from the determined maximum scroll rate which is to be used. No change is necessary if the current maximum scroll rate in use is the same as the one that is to be used for the user selected program guide presentation format and thus no change in the maximum scroll rate is made if the maximum scroll rate in use matches the one determined in step 352. One of sub-steps 358 and 360 is performed based on which maximum scroll rate was determined in step 352 to be the maximum scroll rate which should be used. If the segment list, e.g., genre program guide list, mode of operation is selected, the maximum scroll rate for displaying the program guide list is constrained to the first maximum scroll rate which is higher than the second maximum scroll rate. However, if a non-segmented scrolling mode of operation is to be implemented, e.g., a straight program channel number ordered program guide without any channel number or program groupings, the maximum scroll rate is controlled during display of the program guide to the second maximum scroll rate which is lower than the first maximum scroll rate. In various embodiments the first and second maximum scroll rates may be predetermined rates of scroll. However, in some embodiments, the user selects and sets one or both of said first and second maximum scroll rates, e.g., from a plurality of predetermined scroll rates or by using a slider bar used to indicate the desired scroll rate, as part of a STB configuration operation. The second maximum rate, whether it is predetermined or user selected, is lower than said first maximum scroll rate. As a result of the constraint imposed on the maximum scroll rate, where the channel listings are segmented into groups based on program genre, the scroll rate will be allowed to range from a slow speed up to the first maximum scroll rate. However, when the non-segmented program listing mode is used and the program channels are not arranged into groups, the scroll rate will be limited so that it is lower than the first maximum scroll rate at all times during the non-segmented program guide display mode of operation and so that it does not exceed the second (lower) maximum scroll rate.

Operation proceeds from step 354 in which the maximum scroll rate to be used is set, to step 312 via connecting node 362, the STB determines, based on the user's response to the presented prompt as discussed in step 310, whether or not the user wants to view the genre arranged program guide or the default, e.g., channel number ordered program guide. If in step 312 it is determined that the user does not wish to view the genre arranged program guide, the operation proceeds from step 312 to step 314. In step 314, a regular program guide, e.g., where program listings are not arranged according to genre groups, is displayed to the user.

However, if in step 312 it is determined that the user wants to view the genre arranged program guide, then operation proceeds from step 312 to step 316. In step 316, the STB determines if the genre arranged program guide is already available, e.g., stored in the STB 200 memory. The genre arranged program guide may, and in some embodiments will be, stored in memory if the STB previously received a genre arranged program guide, e.g., from the headend 102, or if it previously generated by the STB 200 based on program listing information which is periodically received from the headend 102.

In step 316 if it is determined that the genre arranged program guide is already available and stored in the memory of STB 200, operation proceeds from step 316 to step 326 via connecting node A 325. If it is determined that the genre arranged program guide is not stored in the memory of STB 200, operation proceeds from step 316 to step 318. It is possible that the STB 200 may not have generated and stored a genre arranged program guide earlier at a time when the user requested to view the genre arranged program guide, e.g., due to lack of sufficient program listing information, at that time, which can be used to generate the genre arranged program guide.

In step 318 the STB 200 requests, from a server, program listing information including program listings arranged according to genre. In some embodiments the request for program listing is sent to the BFS server 117 in headend 102 and the BFS server 117 responds to the request by sending the requested information. Operation proceeds from step 318 to step 320 wherein the STB receives program listing information from the server, the program listing information including information identifying at least one of i) a location in the listing of programs where a first genre ends or ii) a location in the listing of programs where a second program genre begins. In some embodiments the information identifying at least one of: i) a location in said program listing where a first genre ends or ii) a location in said listing of programs where a second program genre begins includes at least one of: i) a channel number corresponding to the last program in the first genre and a corresponding genre identifier; and ii) a channel number corresponding to the first program in the second genre and a corresponding genre identifier. Operation proceeds from step 320 to step 326 via connecting node A 325.

Thus the information received from the server 117 includes identification information identifying the location in the listing of programs where a first genre, e.g., HORROR, ends or a location in the listing of programs where a second program genre, e.g., COMEDY, begins. Such identifying information enables the STB 200 to arrange the program guide according to genre and generate a genre arranged program guide. An exemplary genre arranged program guide 300 is illustrated in FIG. 3 and will be discussed in detail later.

Operation proceeds to step 326. In step 326 the genre arranged program guide is presented, e.g., displayed on the display 204, to the user. Step 326 includes step 328 wherein the STB displays at least a portion of the genre arranged program guide including the listing of programs arranged according to genre to the user. Upon display, the user can browse various programs in the listing of programs which are arranged according to genre, e.g., various horror movies, shows etc., listed together under genre "HORROR".

Operation proceeds from step 326 to 330. In step 330 the STB 200 receives a scroll control signal, e.g., from the user remote control. The scroll control signal is e.g., a signal to scroll through the displayed program guide including the listing of programs. Operation proceeds from step 330 to step 334. In step 334, in response to the scroll control signal, the STB controls the displayed program guide so that the user scrolls through the listing of programs arranged according to genre in the displayed genre arranged program guide.

In accordance with one feature of the invention, steps 336 through 342 are performed as part of step 334 in some embodiments. In step 336 the STB monitors the entries in the listing of programs being displayed to detect when the end of a genre is displayed or the beginning of a genre is displayed indicating a change in the genre of program listings being displayed. Thus the STB monitors the programs listings in the displayed program guide to detect a change in the genre of program listings being displayed, for example to detect when the genre changes from "horror" to "comedy".

Next in step 338 a scrolling rate is decreased when a change in the genre of programs from a first genre of programs being displayed to a second genre of programs being displayed occurs as part of said scrolling. The scrolling rate is a rate at which a user can scroll through the listing of programs in the displayed program guide. In various embodiments step 338 further includes step 340 where the scrolling rate is changed to an initial scroll rate used to scroll through programs at the start of a program listing corresponding to a program genre. For example, as part of decreasing the scroll rate, a current scroll rate may be changed to an initial standard scroll rate which is normally used at the start of program listing corresponding to each new genre, e.g., comedy, or any other genre. In accordance with one feature, in some embodiments the scroll rate is changed later, e.g., increased or decreased, while scrolling through the program listing corresponding to that genre continues as the user scrolls through further. In some embodiments the initial scroll rate is a predetermined scroll rate used to scroll through at the start of the program listings corresponding to each new program genre which is displayed during the scrolling. In various embodiments the decreasing of the scrolling rate is triggered by the monitoring detecting the display of a program listing corresponding to the end of a program genre, e.g., a first program genre, or the display of a program listing corresponding to the beginning of a program genre, e.g., a second program genre.

Next in step 342, the scrolling rate is increased from the decreased rate as the second genre of programs continues to be displayed during the scrolling. In some embodiments, increasing the scrolling rate is continued while the scroll control signal is received until a maximum scroll rate is achieved. Thus in some embodiments, when the user scrolling through the genre arranged program guide continues to scroll through the list, e.g., by hitting move up/down button on the remote control, the scroll rate is increased continuously, as part of increasing the scroll rate from the decreased rate, while the user continues to press the up/down button which causes the STB to continuously receive the scroll control signal from the user remote control.

Figure 4:
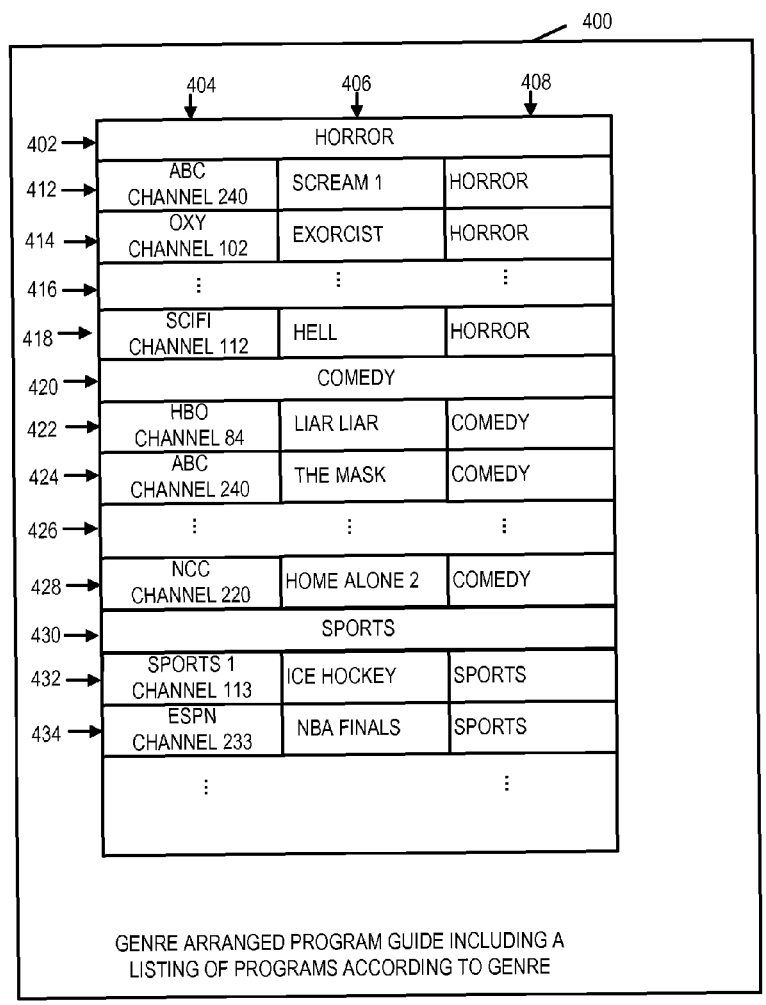
FIG. 4 illustrates an exemplary genre arranged program guide including a channel listing arranged according to genre which may be displayed to a user, in accordance with the invention.

FIG. 4 illustrates an exemplary genre arranged program guide 400 in a grid format which may be displayed to the user when the user decides to view genre arranged program guide, in accordance with the invention. The program guide 400 shows a listing of programs arranged according to genre and includes a plurality of rows and columns showing information regarding the entries in the listing of programs channels. Rows 402, 420 and 430 each corresponds to a different genre of programs. Column 404 of the program guide 400 shows channel name and channel number information, column 406 includes program name/title information while column 408 includes a genre indicator. In some embodiments, a channel number and channel/network name is displayed in each entry in column 402.

In the exemplary program guide shown in FIG. 4, the program listings are arranged according to genre. For example, rows 412 through 418 are within the HORROR genre, while rows 422 through 428 are within the same COMEDY genre. Within the genre arranged program listings, each row corresponds to a program channel. Row 412 corresponds to channel number 240, e.g., ABC channel, and illustrates that movie "SCREAM" will be on channel 240. The genre indicator indicating the genre of the program/movie is also shown. Although not shown in the figure, but the time of broadcast for each program is also indicated in the program guide in the corresponding row. Row 416 corresponds to channel number 102, e.g., OXY channel, and indicates that movie "EXORCIST" will be broadcast on channel 102. Similarly row 418, which is the last entry in the program listings within HORROR genre, indicates that movie "HELL" will be broadcast on channel 112.

Row 420 marks the beginning of the next program genre, e.g., COMEDY, in the genre arranged program guide 400. Rows 422 through 428 fall within the COMEDY genre. Row 422 corresponds to channel number 84, e.g., HBO, and indicates that the movie "LIAR LIAR" will be broadcast on channel 84. The genre indicator indicating the genre of the movie as "COMEDY" is also shown in the same row. Row 424 corresponds to channel number 240, e.g., ABC channel, and indicates that "THE MASK" will be broadcast on channel number 240. Similarly row 428, which is the last entry in the program listings within COMEDY genre, indicates that the movie "HOME ALONE 2" will be broadcast on channel number 220. The time of broadcast for each program/movie may be separately indicated in the program guide.

Row 430 marks the beginning of the next program genre, e.g., SPORTS, in the genre arranged program guide 400. Rows 432 through 434 fall within the sports genre. It should be appreciated that program listing corresponding to only a few genres has been shown in the genre arranged program guide 400 to present a simple example for illustration purposes. However, it should be appreciated that program 400 may include program listings corresponding numerous genres.

As discussed above with regard to the flowchart 300 and in accordance with the invention, a genre arranged program guide is displayed to the user at various times, e.g., upon user request or upon detecting user settings that enable display of genre arranged program guide whenever available.

The STB 200 monitors the entries in the listing of programs being displayed to detect when the end of a genre is displayed or the beginning of a genre is displayed indicating a change in the genre of program listings being displayed. In some embodiments the STB detects a genre change by monitoring the genre indicators corresponding to the entries in the listing of programs such as the ones illustrated in column 408 in FIG. 4 example. In some embodiments the STB detects a genre change by monitoring the genre beginning and/or end markers, e.g., such as rows 402, 420, 430 which act as genre beginning markers. Upon detecting a new genre marker, while scrolling through the listing of programs, the STB 200 determines that a genre change has occurred while scrolling.

With reference to FIG. 4 example, when a genre change is detected as part of the scrolling, e.g., from HORROR to COMEDY at row 422, in accordance with one aspect of the invention the STB 200 decreases the scrolling rate. In various embodiments the scrolling rate is decreased and set to an initial scroll rate used to scroll through programs at the start of a program listing corresponding to a program genre. For example, when the genre change from HORROR to COMEDY is detected the STB decreases the scroll rate from a current scroll rate to an initial scroll rate at the start of program listings corresponding to COMEDY genre, e.g., at the start of row 422. In some embodiments the STB decreases the scrolling rate as a result of detecting the display of a program listing corresponding to the end of a program genre, e.g., upon detecting entries in row 418, or the beginning of a program genre, e.g., upon detecting entries corresponding to row 422.

In various embodiments the scrolling rate is increased from the decreased rate as the second genre of programs continues to be displayed during the scrolling. In some embodiments, increasing the scrolling rate is continued while the scroll control signal is received until a maximum scroll rate is achieved.

An exemplary method of providing program guide information in accordance with some embodiments comprises: displaying at least a portion of a program guide including a listing of programs arranged according to genre; receiving a scroll control signal; and, in response to said scroll control signal, scrolling through said listing of programs, said scrolling through said listing of programs including: decreasing a scrolling rate when a change in the genre of programs from a first genre of programs being displayed to a second genre of programs being displayed occurs as part of said scrolling. In some embodiments, scrolling through said listing of programs further includes increasing said scrolling rate from a decreased rate as the second genre of programs continues to be displayed. In some embodiments, increasing the scrolling rate is continued while said scroll signal is received until a maximum scroll rate is achieved.

One exemplary method of providing program guide information in accordance with some embodiments comprises: displaying at least a portion of a program guide including a listing of programs arranged according to genre; receiving a scroll control signal; and, in response to said scroll control signal, scrolling through said listing of programs, said scrolling through said listing of programs including: decreasing a scrolling rate when a change in the genre of programs from a first genre of programs being displayed to a second genre of programs being displayed occurs as part of said scrolling. In some exemplary embodiments the method of providing program guide information further comprises: determining a scrolling mode of operation to be used at a given point in time, the scrolling mode of operation being one of a segmented list scrolling mode of operation or a non-segmented list scrolling mode of operation; constraining a maximum scroll rate to be equal to or less than a first maximum scroll rate when it is determined that the segmented list scrolling mode of operation is to be used; and constraining the maximum scroll rate to be equal to or less than a second maximum scroll rate when it is determined that the non-segmented list scrolling mode of operation is to be used, said second maximum scroll rate being lower than said first maximum scroll rate.

In some embodiments the segmented list scrolling mode of operation is a mode of operation in which a listing of programs arranged according to genre is displayed; and the non-segmented list scrolling mode of operation is a mode of operation in which a listing of programs is arranged according to channel numbering without regard to the program genre to which programs on a channel correspond, programs corresponding to different genres being intermixed in a program listing when said non-segmented list scrolling mode of operation is used.

In some embodiments, determining a scrolling mode of operation to be used at a given point in time includes determining from user input if the segmented list scrolling mode of operation or the non-segmented list scrolling mode of operation has been selected by the user.

In some embodiments the method further comprises: changing the maximum scroll rate when said determining a scrolling mode of operation detects a change between one of said segmented list scrolling mode of operation and said non-segmented list scrolling mode of operation.

In various embodiments system elements described herein are implemented using one or more modules which are used to perform the steps corresponding to one or more methods of the present invention, for example, presenting, e.g., displaying, a genre arranged program guide to the user, receiving a user input signal requesting display of a genre arranged program guide, receiving a scroll control signal, detecting a change in the genre of program listings being displayed, decreasing and/or increasing the scrolling rate, etc. Each step may be performed by one or more different software instructions executed by a computer processor, e.g., a central processing unit (CPU). In some embodiments the modules may be implemented in software. In some embodiments the modules may be implemented in hardware, e.g., as circuits. In some embodiments the modules may be implemented in a combination of hardware and software.

At least one system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of providing program guide information, the method comprising:
   displaying at least a portion of a program guide including a listing of programs including a plurality of program groups;
   receiving, at a device including a processor and memory, a scroll control signal; and
   operating the processor, in response to said scroll control signal, to:
      automatically alter a scrolling rate to a reduced rate when a change from a first group of programs being displayed to a second group of programs being displayed occurs as part of scrolling through the listing of programs, said automatic change in the scroll rate being temporary unless a user takes an action to stop the scrolling or to reduce the scroll rate; and automatically increase said scrolling rate from the reduced rate as the second group of programs continues to be displayed in the absence of said user action to stop the scrolling or to reduce the scroll rate.

2. The method of claim 1, wherein the processor is configured to:
use a first maximum scroll rate for program guide scrolling when displaying listings which are not grouped according to genre; and
use a second maximum scroll rate when displaying genre grouped channel listings, the second maximum scroll rate being faster than the first maximum scroll rate.

3. The method of claim 1, wherein said processor is further configured to temporarily pause scrolling in respond to detecting said change prior to automatically altering the scrolling rate to the reduced rate.

4. The method of claim 3, further comprising:
requesting a genre channel listing from a source of program information in response to a user scrolling.

5. The method of claim 4, wherein said processor is configured to automatically increase said scrolling rate while said scroll signal is received until a maximum scroll rate is achieved.

6. The method of claim 1, wherein the processor is configured to automatically change the scrolling rate to an initial scroll rate used to scroll through programs at the start of a program listing corresponding to a group of programs as part of automatically altering the scrolling rate to the reduced rate.

7. The method of claim 6, wherein said initial scroll rate is a predetermined scroll rate used to scroll through at the start of the listings corresponding to each new program group which is displayed during said scrolling.

8. The method of claim 1, further comprising:
prior to displaying at least a portion of a program guide including a listing of programs including said plurality of program groups, requesting from a server program listing information including program listings arranged according to program groups.

9. The method of claim 8, further comprising:
receiving from said server said program listing information including program listings arranged according to program groups, said program listing information including information identifying at least one of: i) a location in said listing of programs where a first group of programs ends or ii) a location in said listing of programs where a second group of programs begins.

10. The method of claim 9, wherein said information identifying at least one of: i) a location in said program listing where a first group of programs ends or ii) a location in said listing of programs where a second group of programs begins includes at least one of: i) a channel number corresponding to the last program in said first group of programs and a corresponding program group identifier; and ii) a channel number corresponding to the first program in said second group of programs and a corresponding program group identifier.

11. The method of claim 10, wherein scrolling through said listing of programs further includes:
monitoring entries in said listing of programs which are being displayed to detect when the end of a group of programs is displayed or the beginning of a group of programs is displayed indicating a change in the group of program listings being displayed; and
wherein said altering of the scrolling rate is triggered by said monitoring detecting the display of a program listing corresponding to the end of a group of programs or the display of a program listing corresponding to the beginning of a group of programs.

12. The method of claim 1, further comprising:
prior to displaying at least a portion of a program guide including a listing of programs, ordering program listings according to program groups, said ordering being based on group information included for individual channels in a program listing of channels arranged according to channel number.

13. An apparatus for providing program guide information, the comprising:
a processor configured to control display of at least a portion of a program guide including a listing of programs including a plurality of program groups;
a memory coupled to said processor;
an interface including a receiver configured to receive a scroll control signal; and
wherein said processor is further configured to:
automatically alter a scrolling rate to a reduced rate when a change from a first group of programs being displayed to a second group of programs being displayed occurs as part of scrolling through the listing of programs, said automatic change in the scroll rate being temporary unless a user takes an action to stop the scrolling or to reduce the scroll rate; and
automatically increase said scrolling rate from the reduced rate as the second group of programs continues to be displayed in the absence of said user action to stop the scrolling or to reduce the scroll rate.

14. The apparatus of claim 13, wherein said processor is further configured to:
use a first maximum scroll rate for program guide scrolling when displaying listings which are not grouped according to genre; and
use a second maximum scroll rate when displaying genre grouped channel listings, the second maximum scroll rate being faster than the first maximum scroll rate.

15. The method of claim 13, wherein said processor is further configured to temporarily pause scrolling in response to detecting said change prior to automatically altering the scrolling rate to the reduced rate.

16. The apparatus of claim 15, wherein processor is further configured to request a genre channel listing from a source of program information in response to a user scrolling.

17. The apparatus of claim 13, wherein said processor is further configured to, as part of being configured to alter the scrolling rate, automatically change the scrolling rate to an initial scroll rate used to scroll through programs at the start of a program listing corresponding to a group of programs.

18. The apparatus of claim 13, further comprising:
a transmitter configured to transmit a request to a server requesting program listing information including program listings arranged according to program groups.

19. The apparatus of claim 18, wherein said receiver is further configured to receive from said server said program listing information including program listings arranged according to program groups, said program listing information including information identifying at least one of: i) a location in said listing of programs where a first group of programs ends or ii) a location in said listing of programs where a second group of programs begins.

20. A non-transitory computer readable medium for use in an apparatus for providing program guide information, the non-transitory computer readable medium including computer executable instructions, which when executed by a processor in said apparatus, control the apparatus to perform the steps of:

displaying at least a portion of a program guide including a listing of programs including a plurality of program groups;

monitoring to detect receipt of a scroll control signal; and scrolling, in response to said monitoring detecting receipt of said scroll control signal, through said listing of programs, scrolling through said listing of programs including:

automatically altering a scrolling rate to a reduced rate when a change from a first group of programs being displayed to a second group of programs being displayed occurs as part of scrolling through the listing of programs, said automatic change in the scroll rate being temporary unless a user take an action to stop the scrolling or to reduce the scroll rate; and automatically increasing said scrolling rate from the reduced rate as the second group of programs continues to be displayed in the absence of said user action to stop the scrolling or to reduce the scroll rate.

* * * * *